United States Patent [19]
Nogarede et al.

[11] Patent Number: 5,886,483
[45] Date of Patent: Mar. 23, 1999

[54] CIRCUIT FOR SUPPLYING A PIEZO-ELECTRIC MOTOR

[75] Inventors: Bertrand Nogarede, Toulouse; Eric Piecourt, Castelnau-Montratier, both of France

[73] Assignee: Moulinex S.A., Paris, France

[21] Appl. No.: 750,343

[22] PCT Filed: May 31, 1995

[86] PCT No.: PCT/FR95/00704

§ 371 Date: Feb. 18, 1997

§ 102(e) Date: Feb. 18, 1997

[87] PCT Pub. No.: WO95/34097

PCT Pub. Date: Dec. 14, 1995

[30] Foreign Application Priority Data

Jun. 8, 1994 [FR] France .................................. 94 07028

[51] Int. Cl.[6] .................................................. H01L 41/08
[52] U.S. Cl. .............................................. 318/116; 310/316
[58] Field of Search .................................. 310/316, 317, 310/319; 318/116

[56] References Cited

U.S. PATENT DOCUMENTS

| | | | |
|---|---|---|---|
| 4,727,276 | 2/1988 | Izukawa et al. | 310/316 |
| 4,952,834 | 8/1990 | Okada | 310/316 |
| 5,021,700 | 6/1991 | Takahashi et al. | 310/316 |
| 5,130,619 | 7/1992 | Izuno | 318/116 |
| 5,140,231 | 8/1992 | Kashiyama | 318/116 |
| 5,173,631 | 12/1992 | Suganuma | 310/316 |
| 5,179,311 | 1/1993 | Suganuma | 310/316 |
| 5,461,273 | 10/1995 | Kawasaki et al. | 310/316 |
| 5,563,464 | 10/1996 | Okubu et al. | 310/316 |
| 5,612,598 | 3/1997 | Fukui et al. | 318/116 |
| 5,616,979 | 4/1997 | Nishikawa | 310/316 |
| 5,625,246 | 4/1997 | Suganuma | 310/316 |
| 5,661,359 | 8/1997 | Katsuragawa | 310/316 |

*Primary Examiner*—Mark O. Budd
*Attorney, Agent, or Firm*—Young & Thompson

[57] ABSTRACT

Circuit for supplying a piezoelectric motor (M) comprising a rotor (1) frictionally driven by a stator energized by a piezoelectric element (3) connected to two electrodes (11 and 12) supplied by two high frequency voltages ($V_1'$) and ($V_2'$) of the same amplitude, and phase shifted by approximately 90°. According to the invention, the supply circuit comprises a single high frequency alternating supply source (V) and an adapting means (Q) connected to the alternating supply source (V) and to two electrodes (11 and 12) energizing the piezoelectric element (3) and generating both voltages ($V_1'$) and ($V_2'$). The invention is for use in piezoelectric motors.

10 Claims, 6 Drawing Sheets

CIRCUIT FOR SUPPLYING A PIEZO-ELECTRIC MOTOR

BACKGROUND OF THE INVENTION

The invention relates to a supply circuit for a piezo-electric motor, for example, of the free progressive wave type schematically represented in FIG. 1 and comprising a rotor 1, driven by friction by a stator 2 which is energized by a piezo-electric element 3.

According to a well-known implementation shown in FIG. 2, the piezo-electric element 3 comprises two piezo-electric areas 5 and 6 disposed in series and alternately polarized. These two areas 5 and 6 are separated by two spaces, neither of which receive an active piezo-electric area: a first space 8 usually serving as sensor in the vibration control loop, and a second neutral space 10. The non-illustrated rear face of the piezo-electric element is connected to the ground 9. The area 5 is energized by a first electrode 11 supplied by a high frequency voltage $V_1'$, and the area 6 is energized by a second electrode 12 supplied by a high frequency voltage $V_2'$, said tensions $V_1'$ and $V_2'$ being phase shifted by substantially 90°, and supplied by two alternating supply sources independently created from a DC source. The voltages $V_1'$ and $V_2'$ applied to each of the electrodes cause vibrations in each of the areas 5 and 6, creating two stationary waves whose resultant leads to a free progressive wave resulting in elliptical movements of material points of the elastic element of the stator put in contact with the rotor, which engenders the rotational movement of the rotor with respect to the stator.

The alternating supply sources are thus created by independent supply devices. Such supply devices utilize either two independent magnetic circuits as is described in patents U.S. Pat. No. 5,130,619 and U.S. Pat. No. 5,021,700, or by several independent switches as is described in patent U.S. Pat. No. 5,179,311. These supply devices thus comprise a great number of elements which considerably increases the cost price of such devices, as well as their size.

SUMMARY OF THE INVENTION

The goal of the invention is to remedy the abovecited disadvantages by implementing a novel supply circuit which is reliable and economical.

According to the invention, the supply circuit of a piezo-electric motor comprises a single high frequency alternating supply source, as well as an adapting means connected, on the one hand, to the alternating supply source and, on the other hand, to two electrodes energizing the piezo-electric element and serving to generate the two voltages $V_1'$ and $V_2'$.

Thanks to the invention, the supply circuit of the piezo-electric motor is not oversized, and the novel structure of the supply circuit considerably simplifies the supply of the electrodes energizing the piezo-electric element of the motor while minimizing the cost and limiting the number of components.

BRIEF DESCRIPTION OF THE DRAWINGS

The characteristics and advantages of the invention will emerge from the description to follow which should be considered as a non-limiting example, by reference to the attached drawings in which.

DESCRIPTION OF THE PREFERRED EMBODIMENTS

Figure 1:
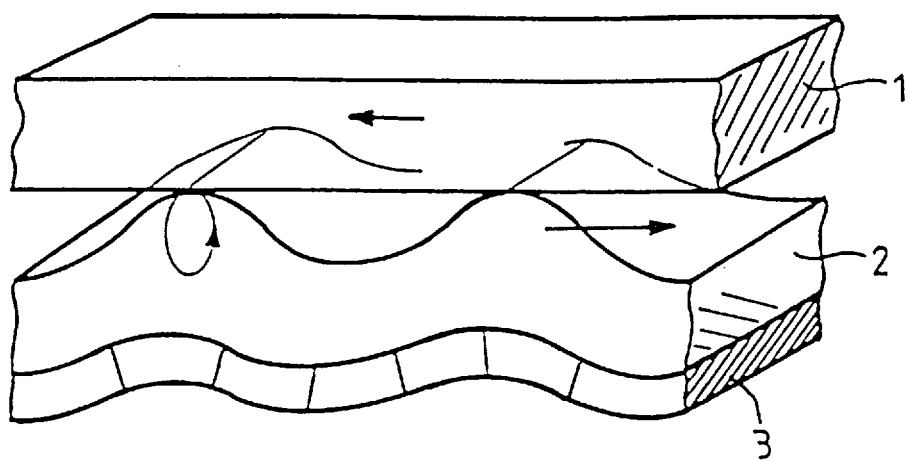
FIG. 1 represents a sectional view of a schematic representation of a piezo-electric motor according to the prior art.
Figure 2:
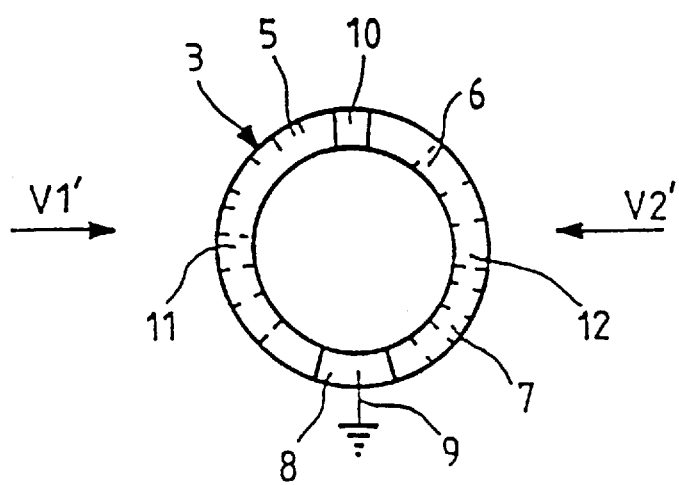
FIG. 2 represents the placement of the electrodes energizing the piezo-electric element of the motor of FIG. 1 according to a conventional implementation.
Figure 3:
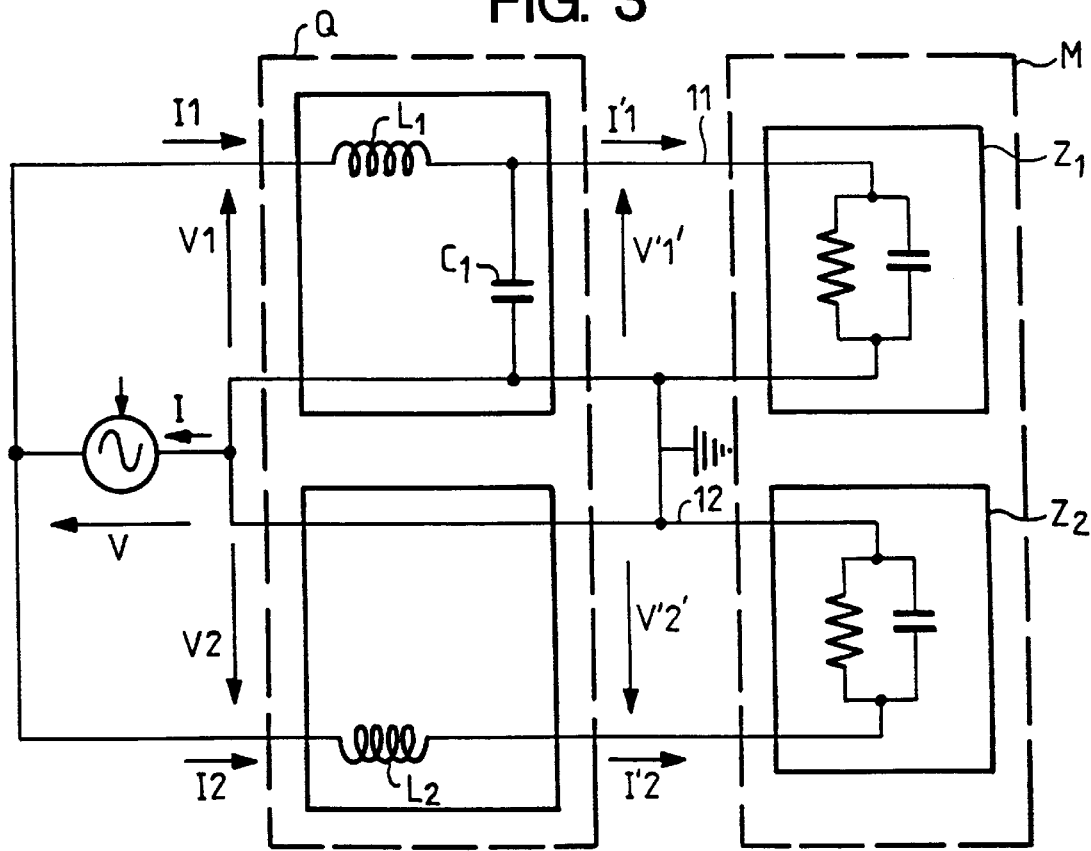
FIG. 3 represents an electrical schematic of a first embodiment of a supply circuit of a piezo-electric motor according to the invention.

As shown in FIG. 3, the supply circuit comprises a single high frequency alternating source V as well as an adapting means Q connected, on the one hand, to the alternating supply circuit V and, on the other hand, to two electrodes 11 and 12 energizing the piezo-electric element 3 and serving to generate the two voltages $V_1'$ and $V_2'$.

The two phases of a free progressive wave piezo-electric motor can be considered as identical from the standpoint of their electrical model characteristics. They can be represented, in a first approximation, by a parallel R-C impedance for a fixed voltage, frequency and delivered coupling.

In such a case, their different electrical relations are defined by:

$V=V_1=V_2$ $I=I_1+I_2$ $V_1'=-Z_1I_1,$ $V_2'=Z_2I_2,$

The supply circuit according to the present invention solves the problem raised by the electrical relation given by:

$V_2'=A_{ef}\theta V_1'(A=1, \theta=\pm 90°).$

Knowing the impedances $Z_1$ and $Z_2$ of the phases 1 and 2 of the piezo-electric motor M is necessary to determine the elements constituting the adapting means Q for a given frequency. The adapting means Q can, for example, comprise two quadripoles comprising passive elements such as a self $L_1$ and a condenser $C_1$ and for the other a single self $L_2$. As will be understood, the disposition, the number, and the choice of passive element constituting the adapting means Q are to be defined by the supply circuit designer.

A relatively simple solution to satisfy the constraints defining the problem given by the electrical relation described above consists in utilizing the adapting means Q in which the electrical relation is:

$V'_2=-jV'_1.$

The values of the passive elements of the adapting means are fully defined by knowledge of the impedances of the phases 1 and 2 of the motors and of the nominal functioning pulsing $W_0$.

Figure 4:
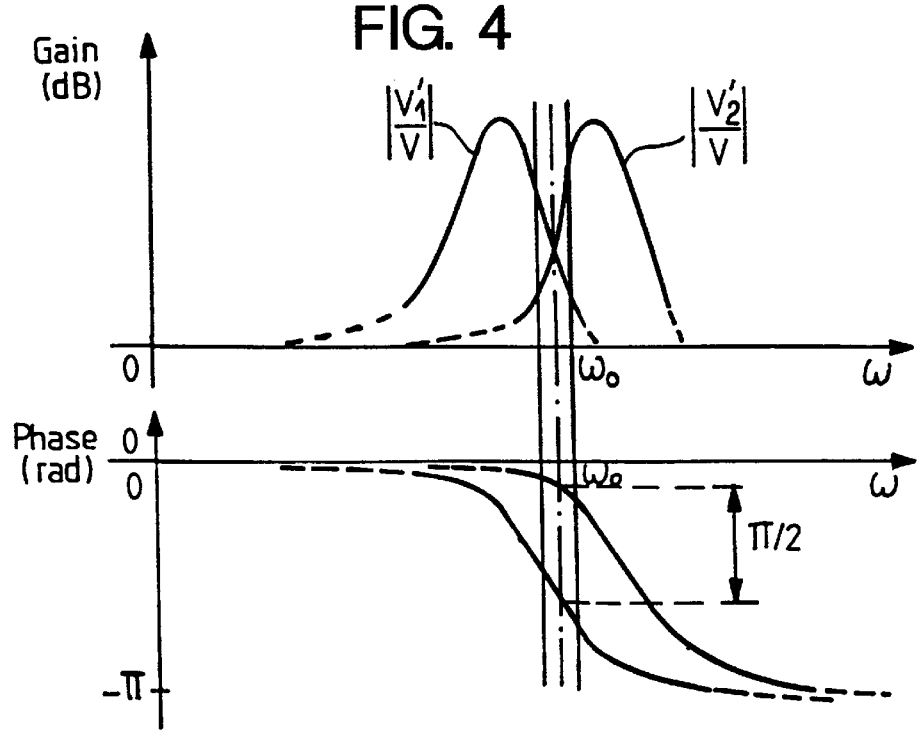
FIG. 4 represents a frequency diagram of the supply circuit according to the invention.

In fact, as illustrated in FIG. 4, the functioning principle of the supply circuit comes down to offsetting, by means of the adapting means Q, meaning with the two quadripoles, the electrical resonant frequencies at the level of the phases 1 and 2 of the motor. This offsetting is effected on either side of the used frequency band located next to the nominal pulsation $W_0$, an adequate dimensioning of the passive elements permitting, from the common alternating voltage source $\underline{V}$, to generate the two voltages $V_1'$ and $V_2'$, in phase quadrature, and having the same amplitude.

Figure 5:
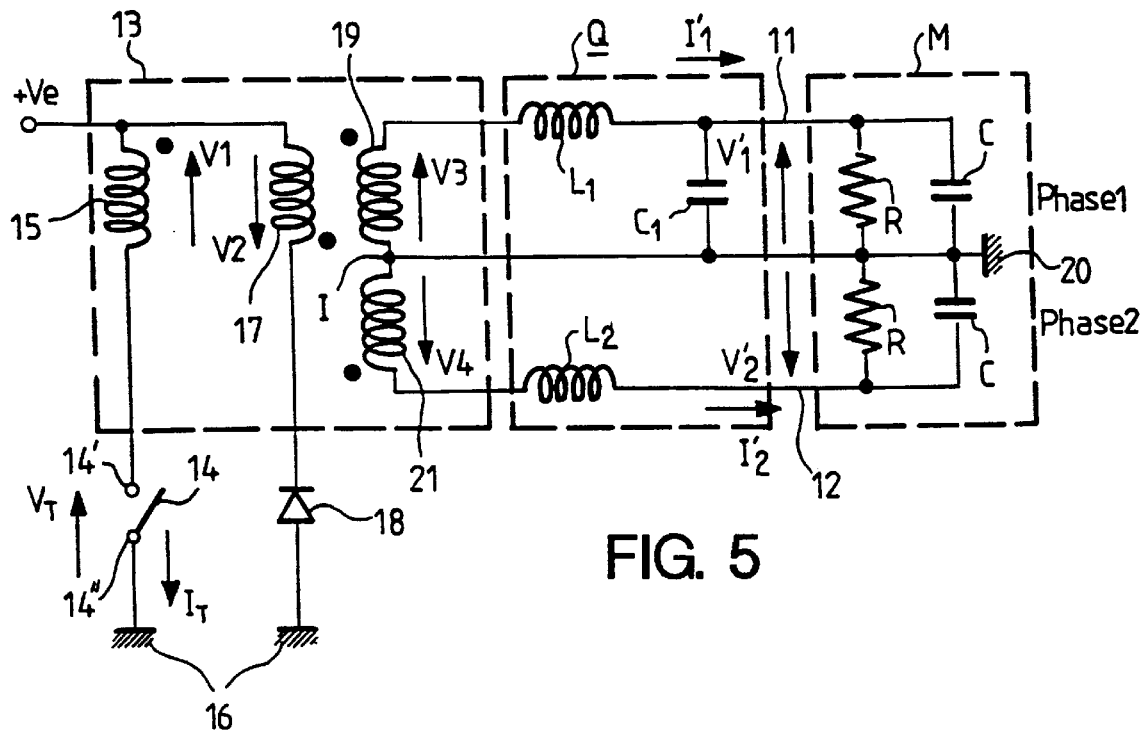
FIG. 5 represents an electrical schematic diagram of a particular mode of the supply circuit according to the invention.

According to a preferred embodiment of the present invention depicted in FIG. 5, the alternating voltage source V is implemented according to a FORWARD type structure and comprises a transformer 13 whose primary stage is, on the one hand, connected to a DC source $V_E$ and, on the other hand, connected to an electronic switch 14, the secondary stage being connected to an adapting means Q. The switch 14 is, for example, a conventional power transistor. The two phases of the free progressive wave piezo-electric motor have been considered as identical with respect to their electrical model characteristics, and have been represented by a parallel R-C impedance for a fixed voltage, frequency, and delivered coupling.

The primary stage of the transformer 13 comprises a first winding 15 whose dotted terminal is connected to the DC voltage source $+V_E$, and the non-dotted terminal is connected to a contact 14' of the switch 14 whose other contact 14" is connected to the ground 16, as well as a second winding 17 whose non-dotted terminal is connected to the DC voltage source $+V_E$ and the dotted terminal is connected to the cathode of a demagnetization diode 18 whose anode is connected to the ground 16.

The secondary stage of the transformer 13 comprises a first winding 19 whose dotted terminal is connected to the end of a first inductance $L_1$ whose other end is connected, on the one hand, to one end of a condenser $C_1$ whose other end is connected to a ground 20 and, on the other hand, to the electrode 11 energizing the piezo-electric element 3, as well as a second winding 21 whose non-dotted terminal is connected to the non-dotted terminal of the first winding 19, corresponding to a midpoint I of the secondary stage. The dotted terminal is connected to one end of a second inductance $L_2$ whose other end is connected to the other electrode 12 energizing the piezo-electric element 3.

The adapting means Q comprises, on the one hand, the first inductance $L_1$ and the condenser $C_1$ constituting, along with the piezo-electric element 3, a first resonant circuit and, on the other hand, by the second inductance $L_2$ constituting, together with the piezo-electric element 3, a second resonant circuit.

The supply circuit functions in the following manner:
when the switch 14 is conductive, the diode 18 is non-conductive and the voltages at the different terminals of the windings are:
$V_1=V_2=E$
$V_3=V_4=kE$ (k: transformation ratio).

When the switch 14 is non-conductive, the diode 18 is conductive, and the voltages become:
$V_1=V_2=-E$
$V_3=V_4=-kE$ Therefore, to ensure a zero average value of the voltage at the terminals of the different windings of the transformer 13, the switch 14 must function with a cyclic ratio less than or equal to ½, the value ½ allowing optimally shaped waves at the phases of the motor.

Figure 6:
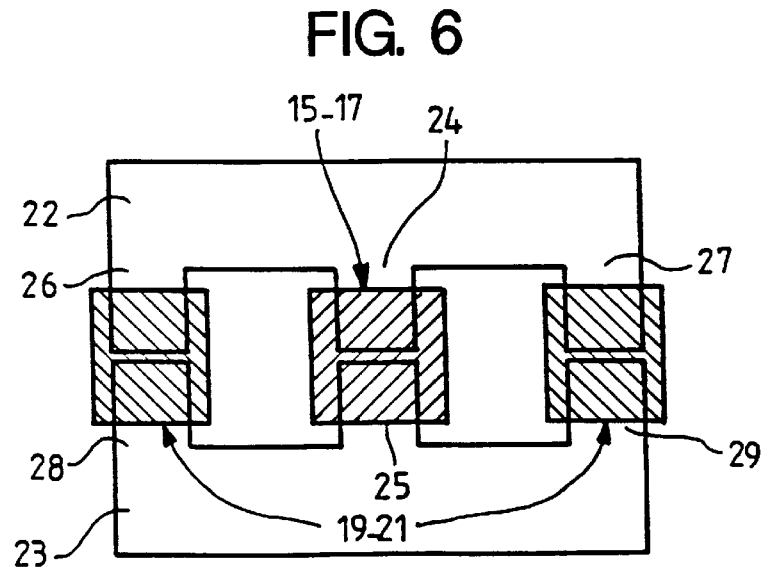
FIG. 6 represents a transformer well adapted to the supply circuit of FIG. 3 according to the invention.
Figure 7A:
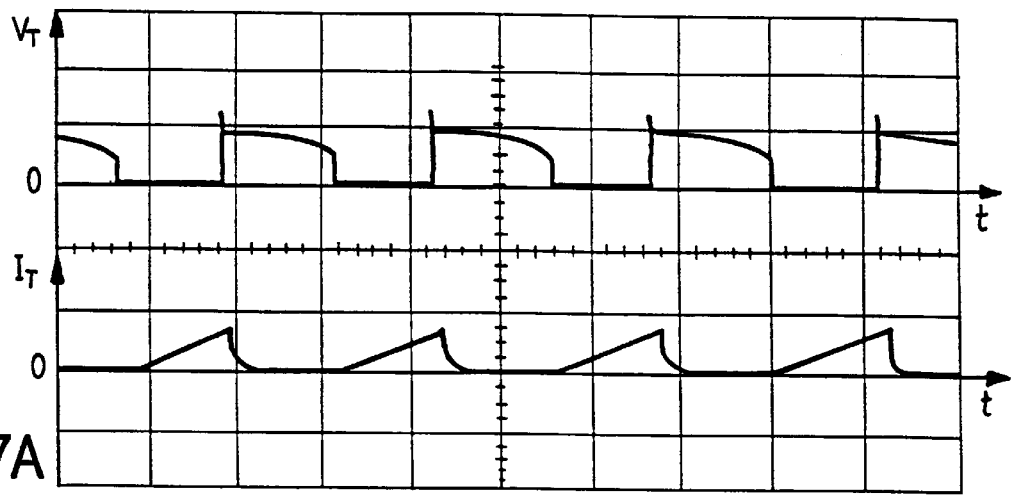
FIG. 7 shows the waveforms obtained with the supply circuit depicted in FIG. 3.
Figure 7B:
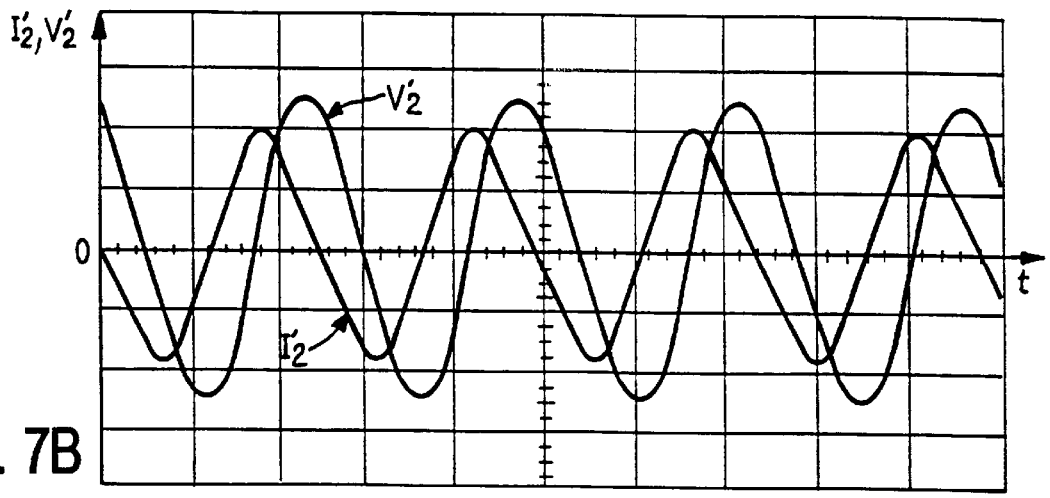
Figure 7C:
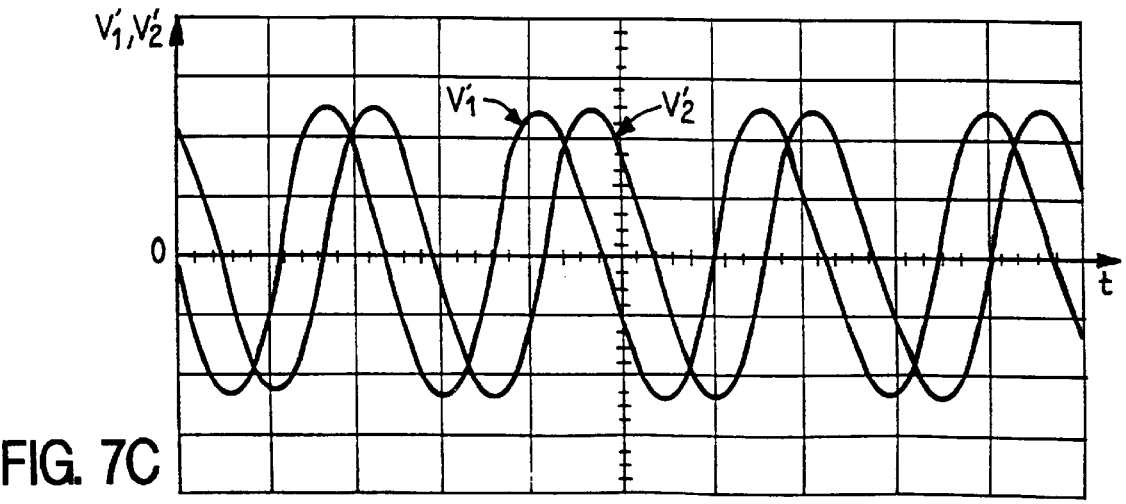

According to an interesting characteristic of the present invention, the two inductances $L_1$ and $L_2$ of the adapting means Q can be constituted by the leak inductances of the transformer 13 itself. This configuration necessitates proportioning, by calculation, of the fields of the transformer to control the leakages from the secondary stage of the transformer 13. In this manner, this new structure simplifies the supply circuit represented in FIG. 5. Such a transformer is represented in FIG. 6 and comprises a magnetic circuit comprising two ferrite half-circuits 22 and 23 in the shape of an "E", and comprising each a central leg 24 or 25, and two exterior legs 26–27 or 28–29; the windings of the primary stage are wound about the central legs 24 and 25 and the windings of the secondary stages are wound about the exterior legs 26–27 and 28–29. The different elements constituting the transformer are assembled by, for example, gluing. Thanks to this type of supply shown in FIG. 5 and to the transformer of FIG. 6, the wave forms shown in FIG. 7 are obtained.

The supply circuit illustrated in FIG. 5 allows the piezo-electric motor M according to the present invention to exhibit a substantially stable speed. However, in order to guarantee this steady speed while allowing a regulation according to different rotational speeds, a device regulating this speed can be joined to the supply described with respect to FIG. 5.

To act on said rotor rotational speed, three regulation modes are possible acting on:
the amplitude of the supply voltage;
the gap between the supply frequency and the resonant frequency;
the relative phase difference of the two supply pathways.

In our supply circuit, the frequency and the relative phase difference are fixed: the elements L and C are calculated for a given frequency $f_0$, and the relative phase difference is equal to 90°. Consequently, the only usable mode of regulation is the variation of the supply voltages.

Figure 8:
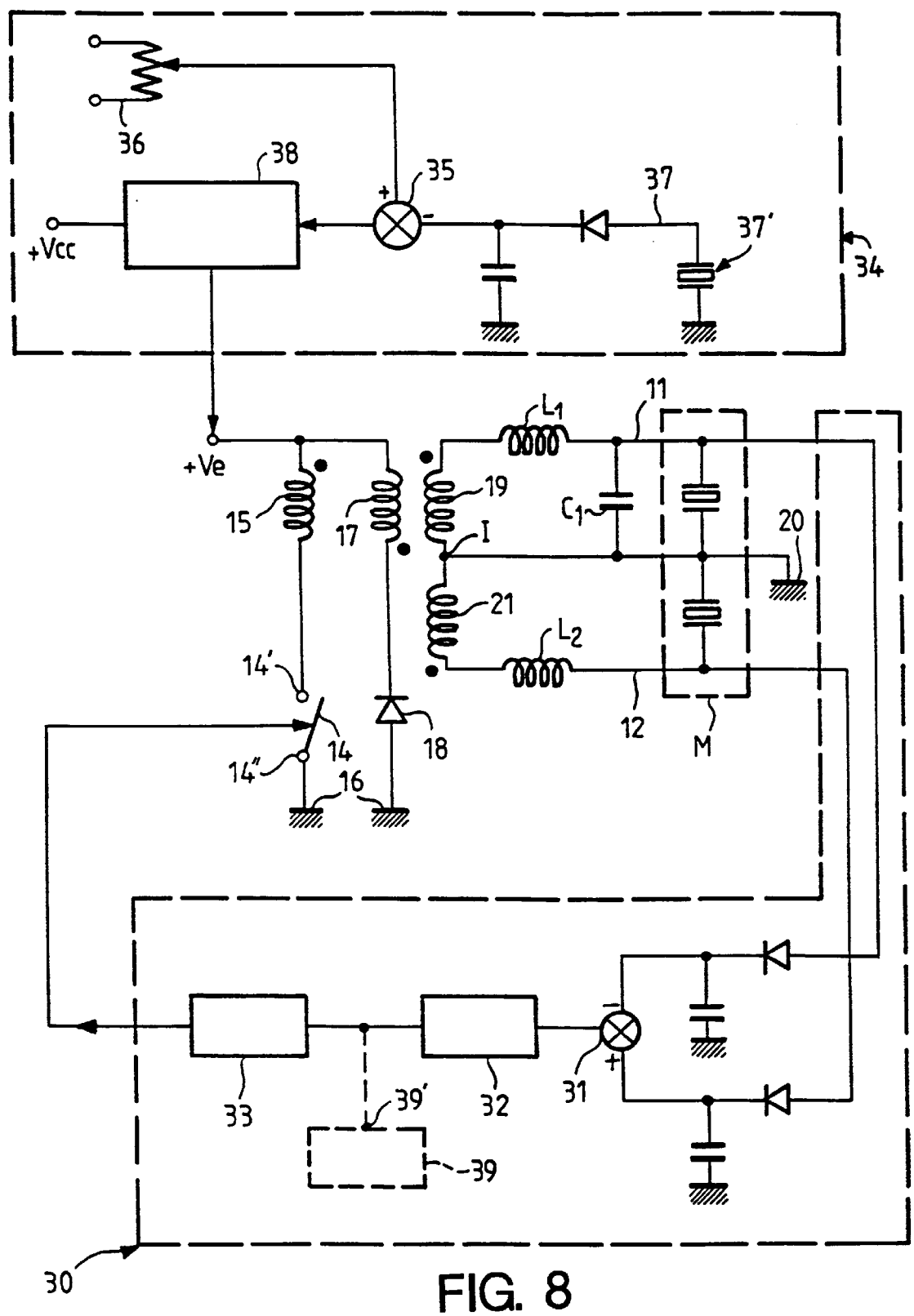
FIG. 8 shows another embodiment of the supply circuit similar to that of FIG. 5, and equipped with a device to regulate the rotational speed of the piezo-electric motor.

For that, the supply circuit represented in FIG. 8 comprises a first control means 30, called first regulation loop, delivering a control signal to the switch 14 in such a manner as to bring the amplitudes of the two out-of-phase voltages $V_1'$ and $V_2'$ in equilibrium and a second control means 34, called second regulation loop, ensuring the regulation of the rotational speed of the piezo-electric motor M.

The above-mentioned first control means 30 comprises, in series, first comparison means 31 having two inputs, one of which is connected to the electrode 11 of the piezo-electric motor M energizing the piezo-electric element by the voltage $V_1'$, and the other being connected to the other electrode 12 of the piezo-electric motor M energizing the piezo-electric element by the voltage $V_2'$, first filtering means 32 of a signal representative of the difference between the two voltages $V_1'$ and $V_2'$, and a voltage/frequency converter 33 generating a control signal to the input of the switch 14.

According to another embodiment of the supply circuit represented in FIG. 8 and illustrated in dashed lines in FIG. 8, the first control means 30 comprises a calculating means 39 of the delivered motor coupling whose input 39' is connected between the first filtering means and the voltage/frequency converter 33.

Such a first control means 30 thus allows the amplitudes of the out-of-phase voltages to be brought in equilibrium by adjusting the functioning frequency of the system. After the comparison of the amplitudes of the voltages of the two phases of the motor, the thus-obtained error signal, after regulation and amplification, is applied to the input of the voltage/frequency converter (VCO) which generates the control signal of the switch T. The system stabilizes itself in this manner at a frequency such that the amplitudes of the supply voltages are identical. This frequency corresponds, in an unloaded state, to the frequency $f_0$ chosen when the values of the L and C elements were chosen. When a charge coupling is applied, which slightly modifies the values of the parameters R and C of the equivalent electrical circuit of the phases of the motor, a slight shifting toward the left of the resonant waveforms of FIG. 4 is observed. If the supply frequency is maintained at the $f_0$ value of the unloaded functioning state, this slight shifting causes, because of the acuity of the resonances put into play, a substantial disequilibrium of the applied voltages: $|V'_1|$ diminishes, whereas $|V'_2|$ increases. The compensation of this phenomenon by the bias of the first control means 30 constitutes a particularly simple means of estimating the delivered coupling, a representation of which is available at the input of the voltage/frequency converter 33 for the suppression of the DC component corresponding to the frequency $f_0$ in the unloaded state. The delivered coupling is thus given by the calculating means 39.

The second control means 34 delivers a regulation signal to the DC source $V_E$ in such a manner as to control said DC voltage source $V_E$.

This second control means 34 comprises in series two comparison means 35 having two inputs, one of which is connected to an input of a device to a consigned speed 36 corresponding to a desired functioning speed of the motor and the other input is connected to an electrode 37 of a stator sensor 37' delivering a signal representative of the rotational speed of the motor, as well as second filtering means 38 of a signal representing the difference between the signal representative of the rotational speed of the motor M and the consigned speed and the generation of the voltage $V_E$ of the DC source.

Such a second control means 34 ensures the regulation of the speed of the motor M. The comparison of the amplitude of the voltage delivered by the electrode of the stator sensor, representing the rotational speed, with a given level corresponding to the desired speed, supplies an error signal which, after regulation and amplification, is applied to the inputs of the second regulation means 38 of the variable level voltage. These means 38 control the DC input voltage of the assembly $V_E$, and thus act upon the speed of the motor. If the stator sensor does not exist, a solution to regulate the speed can consist simply in varying the amplitude of the supply voltages by acting on the voltage $V_E$.

Figure 9:
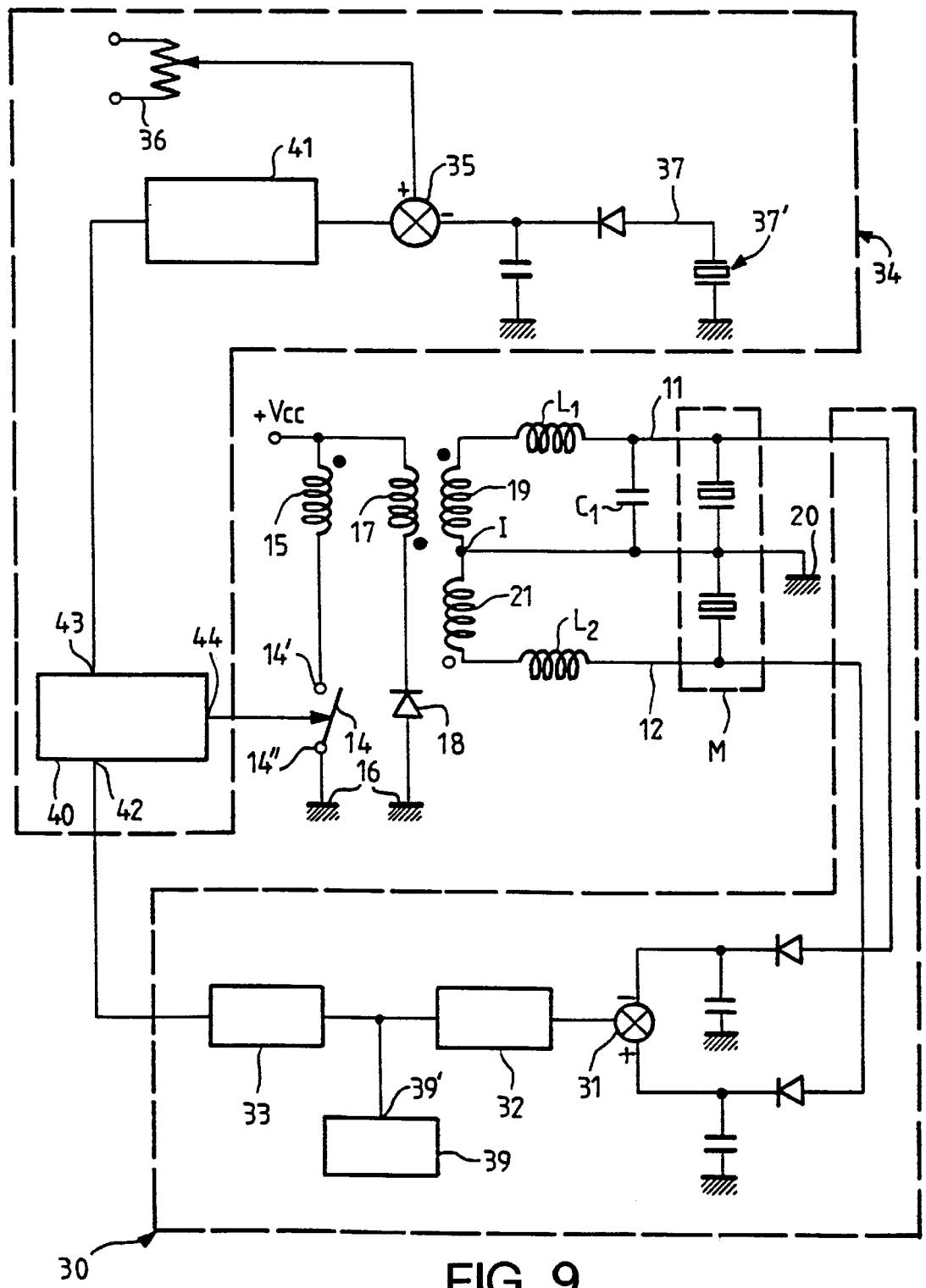
FIG. 9 shows an embodiment of the supply circuit similar to that shown in FIG. 8, and equipped with another device to regulate the rotational speed of the piezo-electric motor.

According to a novel embodiment of the supply circuit which is more advantageous than that represented in FIG. 8, as illustrated in FIG. 9, where the same references designate the same elements as those described in FIG. 8, the second control means 34 comprises in series the second comparison means 35, third filtering means 41 of a signal representative of the difference between the representation of the speed of the rotation M and the consigned speed, as well as a pulse width modulator having two inputs 40 one input 43 of which is connected to the output of the third filtering means 41 and the other 42 is connected to the output of the voltage/frequency converter 33 of the first control means 30 and generating, at its output 44, a variable pulse width control signal at the input of the switch 14.

In this last embodiment, to effectuate a regulation of the voltage applied to the phases of the machine, the cyclic ratio of the control signal of the switch 14 is varied. This solution leads, it is recognized, to a degradation of the supply waveforms when the cyclic ratio departs from its maximum value of ½. Nevertheless, this variation leads to a simplification of the electronic circuits of the second control means 34, therefore improving the feasibility and the cost price of said means 34.

We claim:

1. Supply circuit of a piezo-electric motor (M) comprising a rotor (1) driven by friction with a stator energized by a piezo-electric element (3) connected to two electrodes (11 and 12) supplied, respectively, by two high frequency alternating first and second voltages of same amplitude, and out-of-phase by about 90°, comprising a single alternating high frequency source (V), an adapting means (Q) connected to the alternating high frequency supply source (V) and to two electrodes (11 and 12) energizing the piezo-electric element (3) and generating the first and second voltages, wherein the alternating high frequency supply source (V) comprises a transformer (13) whose primary stage is connected to a DC voltage source ($V_E$) and to an electronic switch (14), and whose secondary stage is connected to said adapting means (Q), wherein the single alternating high frequency supply source is of the FORWARD type, wherein the primary stage of the transformer (13) comprises a first winding (15) whose dotted terminal is connected to a DC voltage source (+$V_E$) and whose non-dotted terminal is connected to a contact (14') of the electronic switch (14) whose other contact is connected to a ground (16), a second winding (17) whose non-dotted terminal is connected to the DC voltage source (+$V_E$) and whose dotted terminal is connected to the cathode of a diode (18) whose anode is connected to the ground (16), and in that the secondary stage of the transformer (13) comprises a first winding (19) whose dotted terminal is connected to an end of a first inductance ($L_1$) whose other end is connected to an end of a condenser ($C_1$) whose other end is connected to a ground (20), and to an electrode (11) energizing the piezo-electric element (3), a second winding (21) whose non-dotted terminal is connected to the non-dotted terminal of the first winding (19) of the secondary stage, and the dotted terminal is connected to the end of a second inductance ($L_2$) whose other end is connected to the other electrode (12) of the piezo-electric element (3).

2. Supply circuit according to claim 1, wherein the adapting means (Q) comprises the first inductance ($L_1$) and the condenser, which with the piezo-electric element (3) comprises a first resonant circuit, and the second inductance ($L_2$), which with the piezo-electric element (3) comprises a second resonant circuit.

3. Supply circuit according to claim 1, wherein the first inductance ($L_1$) and the second inductance ($L_2$) are comprised of the leakage inductances of the transformer (13).

4. Supply circuit according to claim 3, wherein the transformer (13) comprises a magnetic circuit comprised of two ferrite half-circuits in the shape of an E and comprising each a central leg (24 and 25) and two exterior legs (26-27 or 28-29), the windings of the primary stage being wound about the central legs (24 and 25) and the windings of the secondary stage being wound about the exterior legs (26-27 and 28-29).

5. Supply circuit according to claim 1, further comprising a first control means (30) delivering a control signal to the electronic switch (14) in such a manner as to bring the amplitudes of the first and second voltages in equilibrium.

6. Supply circuit according to claim 5, wherein the first control means (30) comprises, in series, first comparison means (31) having two inputs, one of which is connected to an electrode (11) of the piezo-electric motor (M) energizing the piezo-electric element (3) by the first voltage ($V_1'$) and the other is connected to the other electrode (12) of the piezo-electric motor (M) energizing the piezo-electric element (3) by the second voltage ($V_2'$), first filtering means (32) of a signal representative of the difference between the first and second voltages and a voltage/frequency converter (33) generating a control signal to the input of the switch (14).

7. Supply circuit of a piezo-electric motor comprising a rotor driven by friction with a stator energized by a piezo-electric element connected to two electrodes supplied, respectively, by two high frequency alternating first and second voltages of same amplitude, and out-of-phase by about 90°, comprising an alternating high frequency supply source having only one power stage, an adapting means connected to the alternating high frequency supply source and to the two electrodes energizing the piezo-electric element and generating the first and second voltages, the alternating high frequency supply source comprising a transformer whose primary stage is connected to a DC voltage source and to only one electronic switch, and whose secondary stage is connected to said adapting means, the single alternating high frequency supply source being of the FORWARD type, wherein the primary stage of the transformer comprises a first winding whose dotted terminal is connected to a DC voltage source and whose non-dotted terminal is connected to a contact of the electronic switch whose other contact is connected to a ground, a second winding whose non-dotted terminal is connected to the DC voltage source and whose dotted terminal is connected to the cathode of a diode whose anode is connected to the ground, and in that the secondary stage of the transformer comprises a first winding whose dotted terminal is connected to an end of a first inductance whose other end is connected to an end of a condenser whose other end is connected to a ground, and to an electrode energizing the piezo-electric element, a second winding whose non-dotted terminal is connected to the non-dotted terminal of the first winding of the secondary stage, and the dotted terminal is connected to the end of a second inductance whose other end is connected to the other electrode of the piezo-electric element.

8. Supply circuit according to claim 7, wherein the adapting means (Q) comprises the first inductance ($L_1$) and the condenser, which with the piezo-electric element (3) comprises a first resonant circuit, and the second inductance ($L_2$), which with the piezo-electric element (3) comprises a second resonant circuit.

9. Supply circuit according to claim 7, wherein the first inductance ($L_1$) and the second inductance ($L_2$) are comprised of the leakage inductances of the transformer (13).

10. Supply circuit according to claim 9, wherein the transformer (13) comprises a magnetic circuit comprised of two ferrite half-circuits in the shape of an E and comprising each a central leg (24 or 25) and two exterior legs (26-27 or 28-29), the windings of the primary stage being wound about the central legs (24 and 25) and the windings of the secondary stage being wound about the exterior legs (26-27 and 28-29).

* * * * *